Patented Oct. 24, 1944

2,360,959

UNITED STATES PATENT OFFICE 2,360,959

PROCESS OF MAKING TETRA-ACETALS OF GLYOXAL

Louis G. MacDowell, Lakeland, Fla., and Raymond W. McNamee, South Charleston, W. Va., assignors to Carbide and Carbon Chemicals Corporation, a corporation of New York No Drawing. Original application March 18, 1941, Serial No. 383,929. Divided and this application March 10, 1943, Serial No. 478,638

5 Claims. (Cl. 260—615)

This invention relates to an improved method of making tetra-acetals of glyoxal and it includes certain of these as new compounds.

The tetra-acetals of glyoxal derived from lower aliphatic alcohols are known and several processes have been proposed for their preparation. The classic process of Pinner, (Ber. 5, 1872, p. 147) involved heating sodium ethoxide with the diethyl acetal of dichloracetaldehyde to produce glyoxal tetra-ethyl acetal. This process is not adapted for industrial practice. Harries and Temme, (Ber. 40, 1907, p. 165) prepared the same compound in a poor yield by heating trimeric glyoxal with ethyl alcohol in the presence of hydrochloric acid and then permitting the reaction mixture to stand at ordinary temperatures. Recently, Purves, U. S. Patent No. 2,194,405, described the preparation of certain glyoxal tetra-acetals by the reaction of glyoxal sulfate with alcohols in the presence of a metal compound capable of forming an insoluble sulphate with the sulfuric acid formed. This process is not commercially feasible because of the large quantities of inorganic acids and salts involved.

According to the present invention, glyoxal tetra-acetals are prepared in economic yields by the direct reaction at elevated temperatures of glyoxal with an alcohol. The reaction involved may be represented by the following scheme:

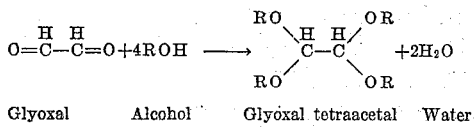

Glyoxal    Alcohol    Glyoxal tetraacetal    Water wherein R represents the organic substituent of an alcohol.

The essential feature of the present invention influencing the production of the glyoxal tetra-acetals in good yields involves the removal of the water of reaction continuously as the reaction progresses. When the alcohol employed is itself water-immiscible, this may be effected in some instances by distilling off the constant boiling mixture of water and alcohol which forms, condensing this mixture and returning the alcohol layer to the reaction vessel. Carrying out the process under reduced pressure will also facilitate removal of the water, especially when the acetal formed is that of a high boiling alcohol. Irrespective of the solubility in water of the alcohol involved, the process may be carried out advantageously in the presence of a volatile, inert, water-immiscible liquid, such as benzene, toluene, xylene, hexane, ethylene dichloride, or isopropyl ether, and the water of reaction can be removed as an azeotropic distillate with this liquid. This procedure has the advantage of permitting the use of lower reaction temperatures, thus retarding the formation of by-products. Regardless of the manner in which the water is removed, it is preferable to carry out the process in the presence of a stoichiometric excess of the alcohol. The temperature at which the process is conducted may vary from but slightly above atmospheric up to temperatures near the boiling point of the acetal products formed. The process is facilitated by the presence of small amounts of an acidic catalyst, including mineral acids, such as hydrochloric and sulfuric acids, as well as acid salts, such as aluminum sulfate and boron trifluoride.

The glyoxal is conveniently added in the form of an aqueous solution where it may exist in the form of a hydrate or a hydrated polymer, possibly tetrahydroxydioxane. Thus, the glyoxal may be employed in the form of aqueous solutions of glyoxal, or as monomeric glyoxal, or in the form of the hydrates, polymers and hydrated polymers of glyoxal. Where the glyoxal is initially associated with water, the invention contemplates that this water will be removed along with the water formed in the reaction. Even when large amounts of water are initially present, which may occur where an impure product containing a hydrated polymer is employed, yields of the tetra-acetal as great as 80% to 90% may be obtained by the method of this invention.

By means of the present process, acetals of both aromatic and aliphatic alcohols may be prepared. Good yields of the glyoxal tetra-acetals of the lower aliphatic alcohols, such as methyl, ethyl, isopropyl, and butyl alcohols, have been obtained, as well as economic yields of the glyoxal tetra-acetals of the higher aliphatic alcohols (that is, those containing at least six carbon atoms), such as n-hexanol, 2-ethyl butanol, 2-ethyl hexanol, and the like. The latter compounds have not heretofore been prepared and they are valuable as high-boiling solvents and as plasticizers, particularly for cellulose derivatives and for polyvinyl acetal resins. In general, the higher acetals are insoluble in water and in the lower alcohols but they are soluble in many common organic solvents and in mineral oils. The lower glyoxal tetra-acetals are powerful solvents of medium boiling points for oils, fats, resins and cellulose derivatives. The tetramethyl acetal is soluble in both water and in oils, and it forms a useful coupling agent in systems including such normally immiscible components.

Under hydrolyzing conditions, usually in the presence of acids, the glyoxal tetra-acetals are slowly converted to glyoxal, and they constitute a source from which this highly reactive material may be liberated under controlled conditions. Thus, they can be used to render casein and other albuminous materials insoluble in water through reaction with glyoxal liberated from them. Likewise, they may also serve as the source of glyoxal in the reduction of vat and indigo dye-stuffs.

The following examples will serve to illustrate the invention:

*Example 1.*—Thirty-six and two-tenths (36.2) grams of an 80% aqueous glyoxal solution (containing 0.5 mol of glyoxal), 520 grams (4 mols) of 2-ethyl hexanol, and 0.6 cc. of concentrated sulfuric acid were heated under reduced pressure in a vessel having a distillation column. An azeotropic mixture of water and 2-ethyl hexanol was continuously distilled from the vessel, condensed, and collected in a decanter where the water was separated from the remainder of the distillate, and from which the 2-ethyl hexanol was returned to the reaction vessel. After about 26 grams of water had been evolved, the excess 2-ethyl hexanol was removed by straight distillation. The residual liquid was washed with sodium bicarbonate solution to neutralize the catalyst and then distilled in vacuo. A 71% yield of the tetra (2-ethylhexyl) acetal of glyoxal was obtained. The major portion of this material boiled at 215°–235° C. at 2 to 3 mm. and possessed a specific gravity of 0.882 at 20° C. The material was insoluble in water, methanol and ethanol, but it was soluble in many common organic solvents and in mineral oil.

*Example 2.*—Fourteen hundred and fifty (1450) grams of impure aqueous glyoxal (containing 21.3% glyoxal) were placed in a distilling kettle with 2564 grams of butanol and 2 cc. of concentrated sulfuric acid. Distillation was started, and an azeotropic mixture of water and butanol was removed continuously. The distillate was condensed, the water decanted, and the butanol layer of the distillate returned to the kettle. When no more water could be distilled, 10 grams of sodium acetate were added to the reaction mixture to neutralize the catalyst, and the excess butanol removed by distillation. Glyoxal tetra-butyl acetal was obtained in a yield of 85.8% based on the glyoxal charged. Glyoxal tetra-butyl acetal boils at 162° C. at 10 mm., and has a specific gravity of 0.890 at 20° C.

*Example 3.*—Eleven hundred and ninety-five (1195) grams of a 48.5% aqueous solution of glyoxal (containing 10 mols of glyoxal), 3200 grams of methanol (100 mols) and 2 cc. of concentrated sulfuric acid were placed in a flask and rapidly distilled without reflux. The vapors were conducted into another flask which was equipped with an efficient fractionating column. The methanol which was obtained at the head of this column was returned continuously to the original reaction flask. After a period of time, the reaction mixture was distilled and a 38% yield of glyoxal tetramethyl acetal was obtained. This material boiled at 78° to 79° C. at 50 mm. and possessed a specific gravity of 1.018 at 20° C.

This application is a division of our copending application, Serial No. 383,929, filed March 18, 1941.

Modifications of the invention other than those disclosed will be readily apparent to those skilled in the art and are included within the invention as defined by the appended claims.

We claim:

1. Process of making a glyoxal tetra-acetal which comprises heating glyoxal in the presence of a small amount of an acidic catalyst with at least four mols of a water-immiscible monohydric alcohol per mol of glyoxal, distilling an azeotropic mixture containing the water of reaction and said alcohol from the reaction mixture as the reaction proceeds, separating said alcohol from the water by condensation and decantation and returning the separated alcohol to the reaction mixture, and recovering a glyoxal tetra-acetal from the reaction mixture.

2. Process for making glyoxal tetra-butyl acetal which comprises heating aqueous glyoxal in the presence of a small amount of an acidic catalyst with at least four mols of butanol per mol of glyoxal, distilling an azeotropic mixture containing the water of reaction and butanol from the reaction mixture as the reaction proceeds, separating the butanol from the water by condensation and decantation and returning the separated butanol to the reaction mixture, and recovering a glyoxal tetra-butyl acetal from the reaction mixture.

3. Process for making glyoxal tetra(2-ethylhexyl) acetal which comprises heating aqueous glyoxal in the presence of a small amount of an acidic catalyst with at least four mols of 2-ethylhexanol per mole of glyoxal, distilling an azeotropic mixture containing the water of reaction and 2-ethylhexanol from the reaction mixture as the reaction proceeds, separating the 2-ethylhexanol from the water by condensation and decantation and returning the separated 2-ethylhexanol to the reaction mixture, and recovering a glyoxal tetra(2-ethylhexyl) acetal from the reaction mixture.

4. As new compounds, glyoxal tetra-alkyl acetals of aliphatic alcohols having at least six carbon atoms.

5. As a new compound, glyoxal tetra (2-ethyl hexyl) acetal.

LOUIS G. MacDOWELL.
RAYMOND W. McNAMEE.